United States Patent
Wang

[11] Patent Number: 5,730,360
[45] Date of Patent: Mar. 24, 1998

[54] HAND WASHING APPARATUS OF A CAR

[76] Inventor: Tang-Cheng Wang, No. 54, Nan Chou, nan Chou Tsun, Shan Shang Hsiang, Tainan Hsien, Taiwan

[21] Appl. No.: 613,323

[22] Filed: Mar. 11, 1996

[51] Int. Cl.⁶ ............................................. A01G 27/00
[52] U.S. Cl. .......................... 239/70; 239/99; 239/289
[58] Field of Search ........................ 239/67, 70, 71, 239/99, 289, 569; 280/727; 4/623; 141/351; 222/185.1; 296/38, 22

[56] References Cited

U.S. PATENT DOCUMENTS

| | | | |
|---|---|---|---|
| 3,888,539 | 6/1975 | Niessner | 296/22 |
| 4,197,895 | 4/1980 | Reyes | 141/38 |
| 4,395,073 | 7/1983 | De Stoutz | 296/22 |
| 4,518,189 | 5/1985 | Belt | 296/22 |
| 4,942,631 | 7/1990 | Rosa | 4/623 |
| 5,060,864 | 10/1991 | Nishi et al. | 239/289 |
| 5,492,247 | 2/1996 | Shu et al. | 222/63 |

*Primary Examiner*—Andres Kashnikow
*Assistant Examiner*—Lisa Ann Douglas
*Attorney, Agent, or Firm*—Morton J. Rosenberg; David I. Klein; Jun Y. Lee

[57] ABSTRACT

A hand washing apparatus disposed in a trunk of a car is provided and comprises a water tank, a pump, an electromagnetic valve, and a control apparatus. The water tank holds water, and on sensing the hands of a user, the sensor sends a message to the control apparatus. Responsive to the message, the control apparatus activates the electromagnetic valve to open and activates the pump to dispense the water from the water tank, so that the user can wash her or his hands with the water pumped from apparatus.

1 Claim, 3 Drawing Sheets

HAND WASHING APPARATUS OF A CAR

SUMMARY OF THE INVENTION

The present invention relates to a hand washing apparatus which comprises a water tank, a pump, an electromagnetic valve, a sensor, and a control apparatus and is fitted in a trunk of a car.

The tank is provided for holding water; the pump is provided for pumping said water out of the tank; the electromagnetic valve is provided for shutting or opening a passage for said water. A water outlet is fitted onto a bottom of the trunk; the sensor is provided for sensing objects, esp. hands of an user to send a message to the control apparatus.

On receiving a message from the sensor sensing said user's hands, the control apparatus activates the pump to pump said water out of the tank and meanwhile activates said electromagnetic valve to open said passage for said water to flow through the water outlet.

A stop delayer is provided to make said pump keep working and said electromagnetic valve stay open for a pre-set preiod of time after the control apparatus activates the same.

As second embodiment of the invention, a power input end of the control apparatus is connected in series with a short preventor and in parallel with a small bulb in the trunk; the control apparatus will be energized to be able to receive said message from the sensor only when an upper cover of the trunk is opened.

When the user places her or his hands under the car, the sensor senses accordingly and sends a message to the control apparatus immediately for it to activate the pump and the electromagnetic valve to open on receiving said message; thus, said water is pumped out of said tank and through the water outlet to outside the car for the user to wash her or his hands.

In the second embodiment, the user has to first open said cover of the trunk for the control apparatus to be energized and can then put her or his hands under the car to activate the sensor for water to flow to outside the car.

BRIEF DESCRIPTION OF THE DRAWINGS

The invention will be better understood by reference to the accompanying drawings, wherein.

DESCRIPTION OF THE PREFERRED EMBODIMENTS

Figure 1:
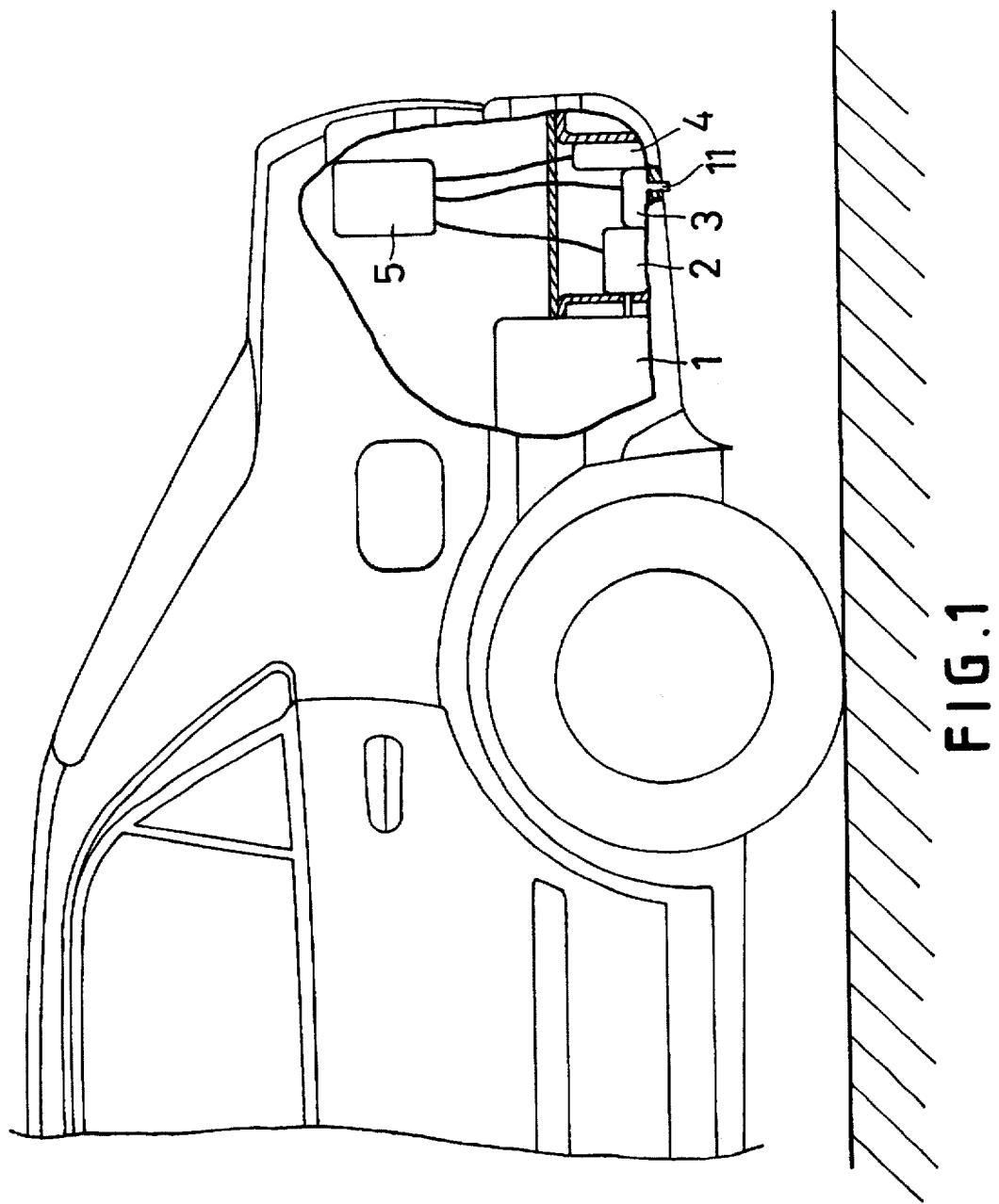
FIG. 1 is a view showing a hand washing apparatus of the present invention fitted onto a trunk of a car.

A hand washing apparatus of the present invention, referring to FIG. 1, is provided which comprises a water tank 1, a pump 2, an electromagnetic valve 3, a sensor 4, and a control apparatus 5 and which is fitted in a trunk of a car.

The tank 1 is provided for holding water; the pump 2 is provided for pumping said water out of the tank 1; the electromagnetic valve 3 is provided for shutting or opening a passage for said water. A water outlet 11 is fitted onto a bottom of the trunk and communicates with outside the trunk; furthermore, the sensor 4 is arranged relatively close to a lower end of the water outlet 11 to sense hands of an user.

On receiving a message from the sensor 4 sensing said user's hands, the control apparatus 5 activates the pump 2 to pump said water out of the tank 1 and meanwhile activates said electromagnetic valve 3 to open said passage for said water to flow through the water outlet 11 to outside the car.

A stop delayer 51 is provided, which makes said pump 2 keep working and said electromagnetic valve 3 stay open for a pre-set preiod of time after the control apparatus 5 starts the same; thus, a proper amount of said water can be provided for the user.

Figure 3:
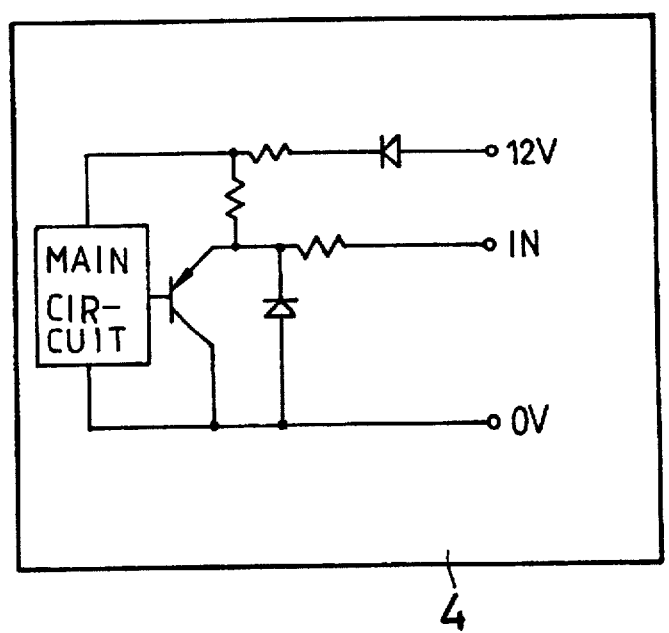
FIG. 3 is a circuit diagram of a sensor for the hand washing apparatus.
Figure 4:
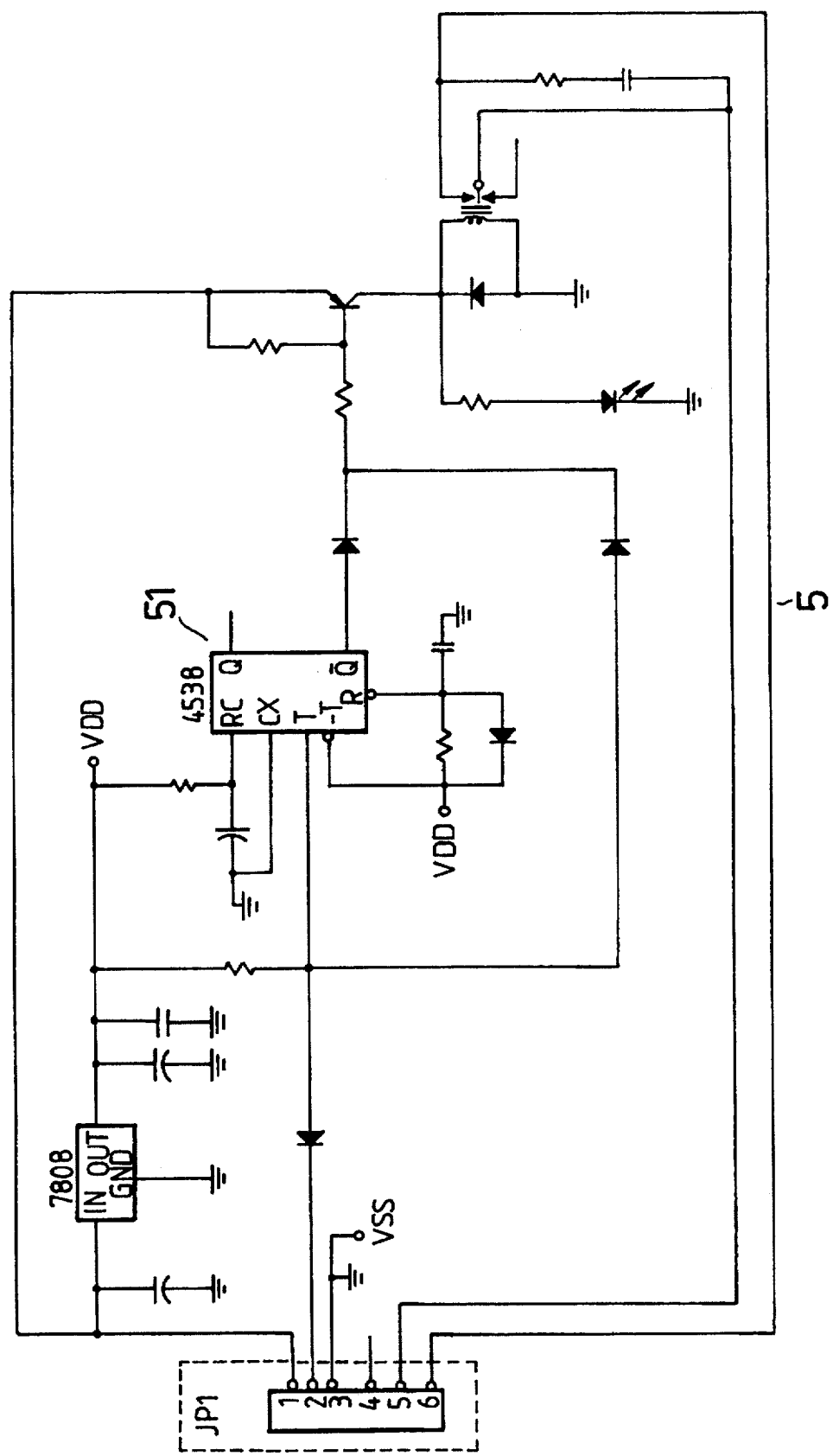
FIG. 4 is a circuit diagram of a control apparatus 25 for the hand washing apparatus.

Circuits for the sensor 4 and the control apparatus 5 are shown on FIG. 3 and FIG. 4 respectively, which are not claimed to be an invented subject matter of the present invention.

Figure 2:
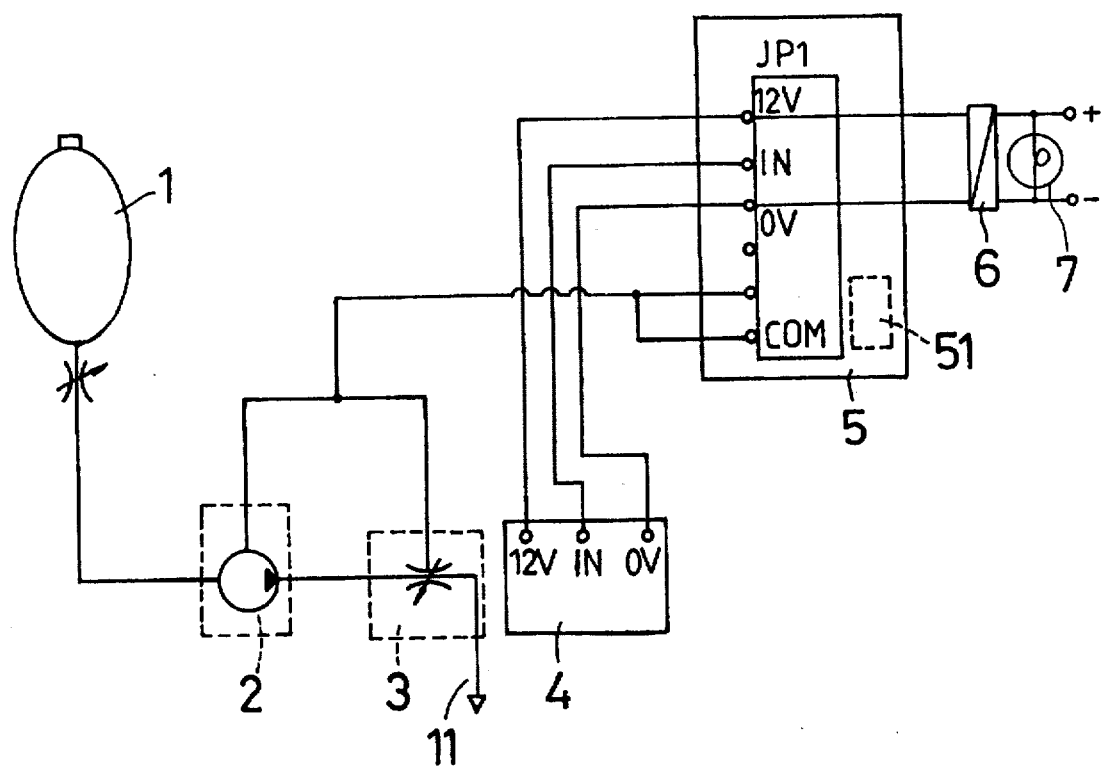
FIG. 2 is a circuit diagram of a hand washing apparatus of the present invention.

As a second embodiment of the invention, referring to FIG. 2, a power input end of the control apparatus 5 is connected in series with a short preventor 6 and in parallel with a small bulb 7 in the tunk; the control apparatus 5 will be energized only when an upper cover of the trunk is opened, i.e. the control apparatus 5 can receive a message from the sensor 4 to activate the pump 2 and activate the electromagnetic valve 3 to open only when said upper cover is opened, said small bulb 7 being energized to light simultaneously.

Referring to FIG. 1, when the user places her or his hands under the car, the sensor 4 senses accordingly and sends a message to the control apparatus 5 immediately, which activates the pump 2 and the electromagnetic valve 3 to open on receiving said message; thus, said water is pumped out of said tank 1 and through the water outlet 11 to outside the car for the user to wash her or his hands.

Referring to FIGS. 1, 2, when said power input end of the control apparatus 5 and said small bulb are connected in parallel, the user has to first open said cover of the trunk for the control apparatus 5 to be energized and can then put her or his hands under the car to activate the sensor 4 for water to flow to outside the car.

Connecting said small bulb and the power input end of the control apparatus 5 in parallel, the control apparatus 5 is not energized and so won't be activated by the sensor 4 sensing objects when said upper cover of the tunk is not opened.

From the above described, it can be understood that the hand washing apparatus of a car has advantages as follows:

1. when driving the car to go on a picnic or after fixing the car, the hand washing apparatus can be used for washing hands;

2. putting hands close to the sensor 4 is the only action needed to operate said apparatus, the user can feel convenient; and, 3. if said small bulb 7 and the power input end of the control apparatus 5 are connected in parallel to necessitate said opening the cover of the trunk for energizing said control apparatus 5, the hand washing apparatus is prevented from unwantingly letting water flow outward when the sensor 4 senses objects other than the user's hands or when the car is being driven.

What is claimed is:

1. A hand washing apparatus disposed in a trunk of a car, comprising:

a water tank for holding water;

an electromagnetic valve coupled in fluid communication with said water tank for controlling water flow therethrough;

a water outlet passing through a wall of the trunk for dispensing water external to the car;

a pump coupled in fluid communication between said water tank and said electromagnetic valve for pumping water from said water tank;

a sensor for sensing hands of a user adjacent said water outlet and output of a signal responsive thereto;

a control apparatus having a respective output coupled to said pump and said electromagnetic valve and an input coupled to said sensor for initiating said pump and opening said electromagnetic valve responsive to said signal output from said sensor, a power input of said control apparatus being connected in parallel with a small bulb in the trunk of the car to necessitate opening a cover of the trunk for energizing said control apparatus, the small bulb being energized to light when the cover is opened; and, a stop delayer for maintaining operation of said pump and maintaining said electromagnetic valve in an open condition for a predetermined time period subsequent to output of said signal from said sensor.

* * * * *